(12) United States Patent
Majima et al.

(10) Patent No.: US 9,325,829 B2
(45) Date of Patent: Apr. 26, 2016

(54) COMMUNICATION APPARATUS

(71) Applicant: FUJITSU TEN LIMITED, Kobe-shi, Hyogo (JP)

(72) Inventors: Hiroshi Majima, Kobe (JP); Gaku Onishi, Kobe (JP); Katsuyuki Shibata, Kobe (JP); Norio Oya, Kobe (JP); Masanobu Washio, Kobe (JP); Keisuke Yamano, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 13 days.

(21) Appl. No.: 14/486,169

(22) Filed: Sep. 15, 2014

(65) Prior Publication Data

US 2015/0094052 A1    Apr. 2, 2015

(30) Foreign Application Priority Data

Sep. 30, 2013  (JP) .................................. 2013-203275

(51) Int. Cl.
*H04M 3/00* (2006.01)
*H04M 1/725* (2006.01)
*H04M 1/60* (2006.01)

(52) U.S. Cl.
CPC ........ *H04M 1/72533* (2013.01); *H04M 1/6083* (2013.01)

(58) Field of Classification Search
None
See application file for complete search history.

(56) References Cited

FOREIGN PATENT DOCUMENTS

| | | | |
|---|---|---|---|
| JP | 2009-027586 | * | 2/2009 |
| JP | A-2009-027586 | | 2/2009 |
| JP | A-2011-043951 | | 3/2011 |

* cited by examiner

*Primary Examiner* — Adolf Dsouza
(74) *Attorney, Agent, or Firm* — Oliff PLC

(57) ABSTRACT

Each of a plurality of commands is intermittently transmitted to an electronic apparatus in accordance with an operating procedure. Thus, the plurality of commands are intermittently executed on the electronic apparatus in accordance with the operating procedure, and an operation screen is displayed in stages. Therefore, a user can grasp the operating procedure until an intended operation screen is displayed.

11 Claims, 16 Drawing Sheets

COMMUNICATION APPARATUS

BACKGROUND OF THE INVENTION

1. Field of the Invention

The invention relates to a technology for supporting an operation by a user.

2. Description of the Background Art

In recent years, multi-functioning and high functionality of electronic devices such as car navigation apparatuses have been advancing, and their operation methods become more complicated. Further, their operation screens are hierarchized by adoption of a touch panel or the like, and a plurality of operations are required to reach a desired operation screen. In such electronic devices, a user who is not skilled in operations cannot easily reach the desired operation screen.

Therefore, a technology for causing a mobile terminal owned by the user to display an operation manual of an electronic device, and to immediately display the desired operation screen by omitting the intermediate progress of the operation is proposed. Thus, the user does not have to carry the operation manual, and can immediately reach the desired operation screen without performing the plurality of operations.

However, when intermediate operation screens are omitted and the desired screen is immediately displayed, what kind of operation and hierarchy are passed through to reach the operation screen cannot be discriminated by the user. Therefore, when displaying the same screen again, the user needs to cause the mobile terminal to display the operation manual again and to transmit an instruction. In such a technology, even if the user repeatedly operates the device, the user cannot be skilled in the operations, which has been an issue.

SUMMARY OF THE INVENTION

According to one aspect of the invention, a communication apparatus that is capable of communicating with an electronic apparatus includes: a memory that stores a plurality of commands respectively corresponding to a plurality of user operations to be performed in sequence on the electronic apparatus to cause the electronic apparatus to perform a predetermined operating procedure; and a transmitter that intermittently transmits each of the commands from the communication apparatus to the electronic apparatus in accordance with the predetermined operating procedure. The commands cause the electronic apparatus to display an operation screen in stages according to each of the user operations, and to perform a predetermined function or display the operation screen related to the predetermined function when accepting the plurality of user operations in accordance with the predetermined operating procedure.

Since the plurality of commands are intermittently executed in accordance with the operating procedure on the electronic apparatus, the operation screen is displayed in stages. Therefore, the user can understand the operating procedure until the predetermined function is performed or the intended operation screen is displayed.

According to another aspect of the invention, a server apparatus that communicates with a communication apparatus which is capable of communicating with an electronic apparatus includes: a memory that stores a set of a plurality of commands respectively corresponding to a plurality of user operations to be performed in sequence on the electronic apparatus to cause the electronic apparatus to perform a predetermined operating procedure for each model of a plurality of models of the electronic apparatus; and a transmitter that transmits the set of the plurality of commands according to a specified model of the electronic apparatus to the communication apparatus. The commands cause the electronic apparatus to display an operation screen in stages according to each of the user operations, and to perform a predetermined function or display the operation screen related to the predetermined function when accepting the plurality of user operations in accordance with the predetermined operating procedure.

Thus, the set of the plurality of commands according to the model of the electronic apparatus can be provided for the communication apparatus.

According to another aspect of the invention, a communication system includes an electronic apparatus and a communication apparatus that is capable of communicating with the electronic apparatus. The electronic apparatus includes: an acceptance part that accepts a user operation; and a display that displays an operation screen in stages according to the user operation and that displays a screen by which a predetermined function is performed or the operation screen related to the predetermined function when accepting a plurality of user operations in accordance with a predetermined operating procedure. The communication apparatus includes: a memory that stores a plurality of commands respectively corresponding to the plurality of user operations to be performed in sequence to cause the electronic apparatus to perform the predetermined operating procedure; and a transmitter that intermittently transmits each of the commands from the communication apparatus to the electronic apparatus in accordance with the predetermined operating procedure.

Since the plurality of commands are intermittently executed in accordance with the operating procedure on the electronic apparatus, the operation screen is displayed in stages. Therefore, the user can understand the operating procedure until the predetermined function is performed or the intended operation screen is displayed by use of the communication system.

Therefore, an object of the invention is to provide a technology by which the user can learn the operation method of the on-vehicle device and become skillful in operations when the operation desired by the user is realized or the operation screen is displayed.

These and other objects, features, aspects and advantages of the present invention will become more apparent from the following detailed description of the present invention when taken in conjunction with the accompanying drawings.

DESCRIPTION OF THE EMBODIMENTS

Hereinafter, some embodiments of the invention are described based on attached drawings.

1. First Embodiment 1-1. Outline

Figure 1:
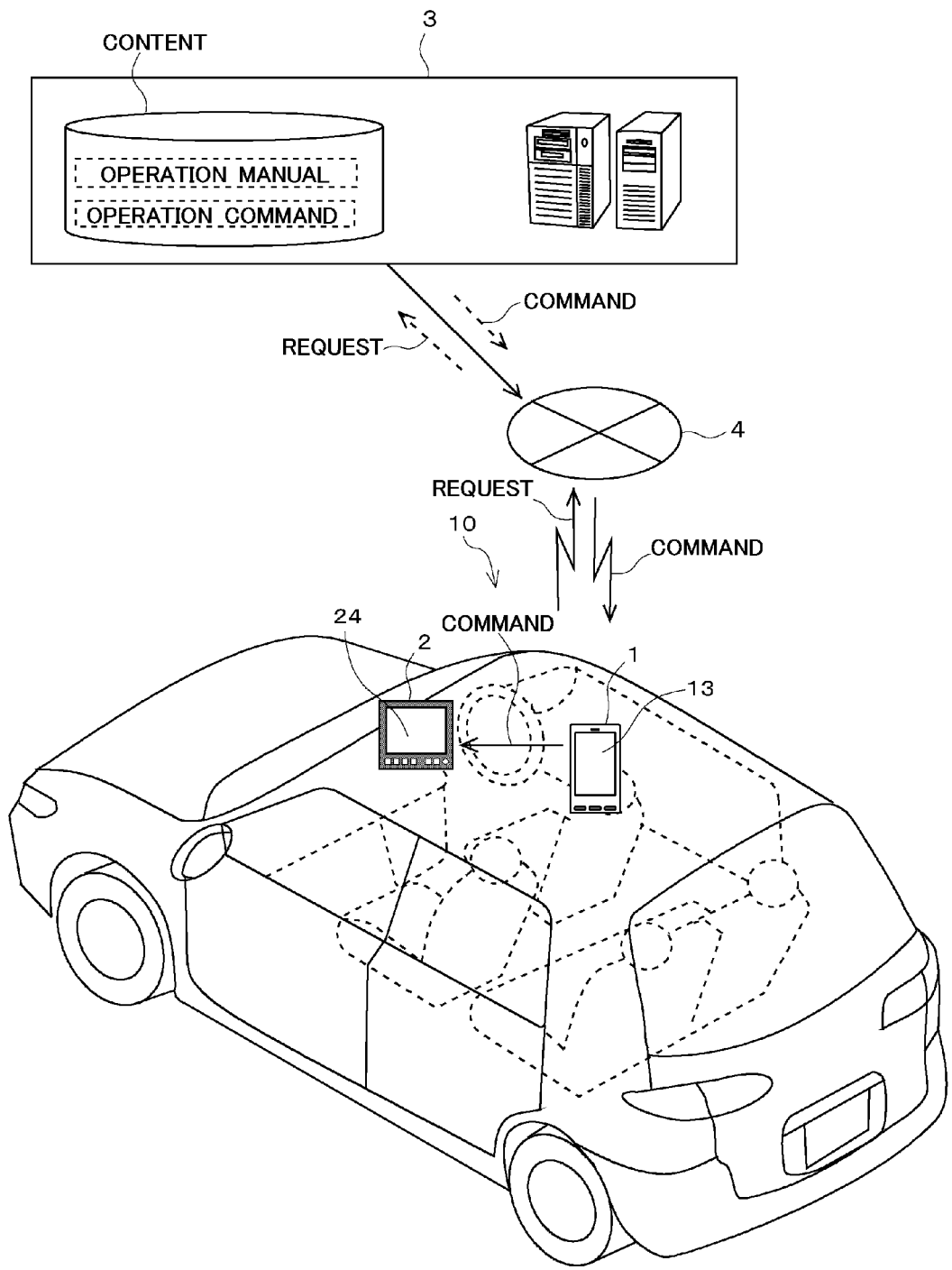
FIG. 1 shows an outline of a communication system.

FIG. 1 shows an outline of a communication system 10 including a mobile terminal 1 and an on-vehicle device 2 in the first embodiment.

The mobile terminal 1 is a portable communication apparatus such as a smartphone and a mobile phone, and is used for information communication by a user inside and outside of a vehicle.

The on-vehicle device 2 is an electronic apparatus which is mounted on a vehicle, such as a car navigation apparatus. Also, the on-vehicle device 2 functions as a communication apparatus which transmits/receives data to/from the mobile terminal.

The communication system 10 is configured as a system by the information communication performed between the mobile terminal 1 and the on-vehicle device 2.

A server 3 stores a variety of contents, and transmits/receives a content to/from the mobile terminal 1 through a network 4. The content includes image data and music data as well as an operation manual of the on-vehicle device 2 and operation commands for operating the on-vehicle device 2.

The user downloads an application for operation manual matching the on-vehicle device 2 from a predetermined server, and causes the mobile terminal 1 to store the application for operation manual. The user starts the application, and causes the mobile terminal 1 to display the operation manual explaining a desired operation.

When the user touches a start switch of a touch panel in a state where the operation manual is displayed, the operation command is sequentially transmitted to the on-vehicle device 2 at intervals. Every time receiving a command, the on-vehicle device 2 executes the command.

As a result, a screen sequentially changes on the on-vehicle device 2, and the operation screen for carrying out a desired function is displayed. Or, the desired function itself is carried out. When the screen changes, a touch switch is displayed being touched by the user. That is, the touch switch is highlighted or the like.

The user can grasp an operating procedure by referring to the changing operation screens on a display 24. When displaying a similar screen again, the user can operate the on-vehicle device 2 in accordance with the grasped operating procedure by himself/herself.

If the user is skilled in the operating procedure, the user does not have to refer to the operation manual again, and the complexity of operating the on-vehicle device 2 with the mobile terminal 1 can be removed.

1-2. Configuration

Figure 2:
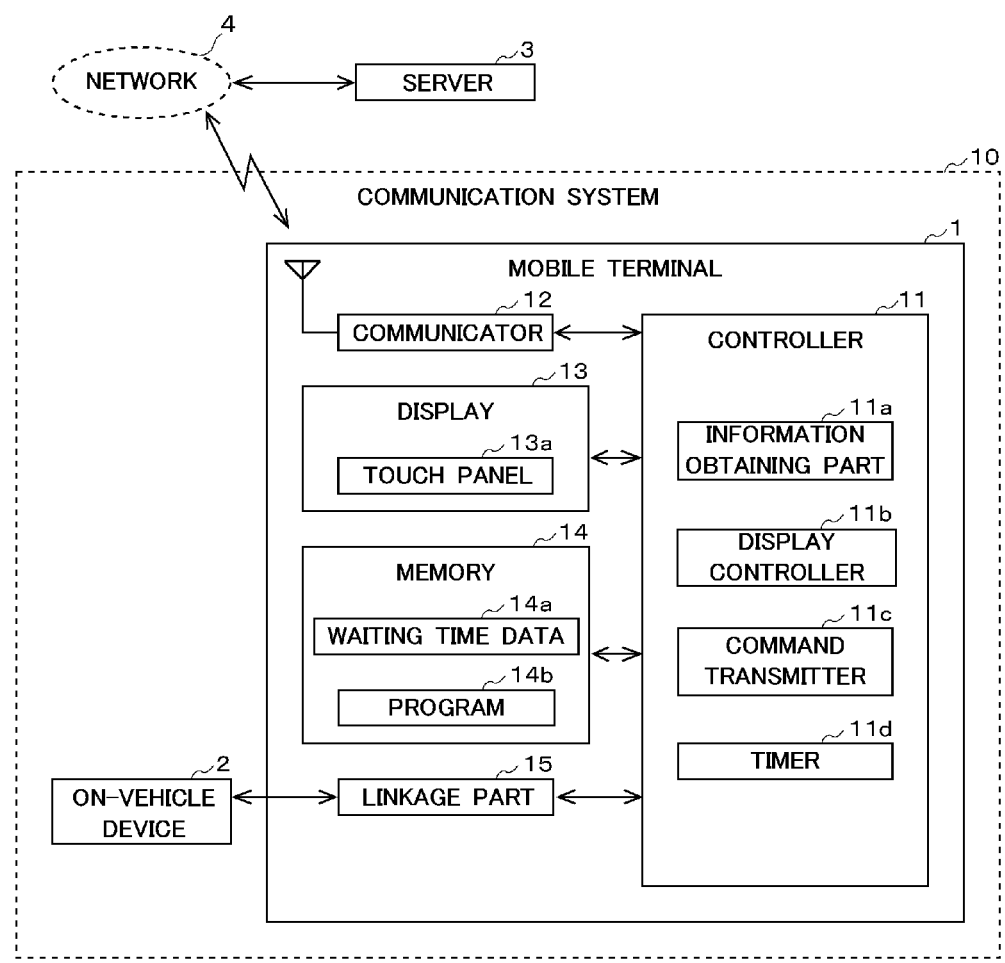
FIG. 2 shows a configuration of a mobile terminal in the first embodiment.

Next, the configuration of the communication system 10 including the mobile terminal 1 and the on-vehicle device 2 is explained in detail. First, the configuration of the mobile terminal 1 is explained. FIG. 2 shows a configuration of the mobile terminal 1.

The mobile terminal 1 is a portable communication apparatus, and is used for information communication by a user inside and outside of a vehicle such as a car. For example, the mobile terminal 1 is a smartphone or a mobile phone. The mobile terminal 1 uses a communication function, and communicates information with the on-vehicle device 2 and the server 3. The mobile terminal 1 also has a function for executing the application downloaded from a predetermined server. The mobile terminal 1 also includes a controller 11 for controlling the entire terminal, a communicator 12, a display 13, a memory 14, and a linkage part 15.

The controller 11 is a microcomputer including a CPU, RAM, and ROM. The controller 11 is connected to other configurations included in the mobile terminal 1, and controls the entire device. Each function included in the controller 11 is described later.

The communicator 12 includes the communication function utilizing wireless communication, and accesses the network 4 to communicate information with the server 3. For example, the information communication utilizing a wireless communication technology such as WiMAX (Worldwide Interoperability for Microwave Access) and LTE (Long Term Evolution) is performed.

The display 13 displays various information such as characters and figures, and visually presents the information to the user. For example, the display 13 is a display apparatus such as a liquid crystal display, a plasma display, and an organic EL display. The display 13 includes a touch panel 13a.

The touch panel 13a detects a user's touch on a button area displayed on the display 13, and transmits the detected position information to the controller 11.

The memory 14 is a memory for storing data. For example, the memory 14 is a non-volatile storage medium such as EEPROM (Electrical Erasable Programmable Read-Only memory), flash memory, and a hard disk drive including a magnetic disk. The memory 14 also stores waiting time data 14a and a program 14b. The memory 14 also stores the content transmitted by the server 3.

The waiting time data 14a are time data. The waiting time data 14a are determined based on the interval at which the mobile terminal 1 transmits the operation command to the on-vehicle device 2.

The program 14b is read out by the controller 11, and is the firmware executed so that the controller 11 controls the mobile terminal 1. The program 14b is also a program of the application downloaded from the server.

The linkage part 15 includes the communication function utilizing low-power radio communication, and communicates information with the on-vehicle device 2 which exists at a short distance. For example, the information communication utilizing a wireless LAN technology such as Wi-Fi (Wireless Fidelity) or a short-distance wireless communication standard such as Bluetooth is performed.

Each function included in the above-described controller 11 is explained. The controller 11 includes an information obtaining part 11a, a display controller 11b, a command transmitter 11c, and a timer 11d.

The information obtaining part 11a controls the communicator 12 and the linkage part 15, and transmits/receives various information to/from the on-vehicle device 2 and the server 3.

The display controller 11b displays the data such as images and characters on the display 13. The display controller 11b also changes the image and the like to be displayed on the display 13 based on a touch position input to the touch panel 13a.

The command transmitter 11c transmits the operation command described later to the on-vehicle device 2 via the linkage part 15. The operation command is described later.

The timer 11d is a timer for measuring the elapsed time after the command transmitter 11c transmits the operation command.

Figure 3:
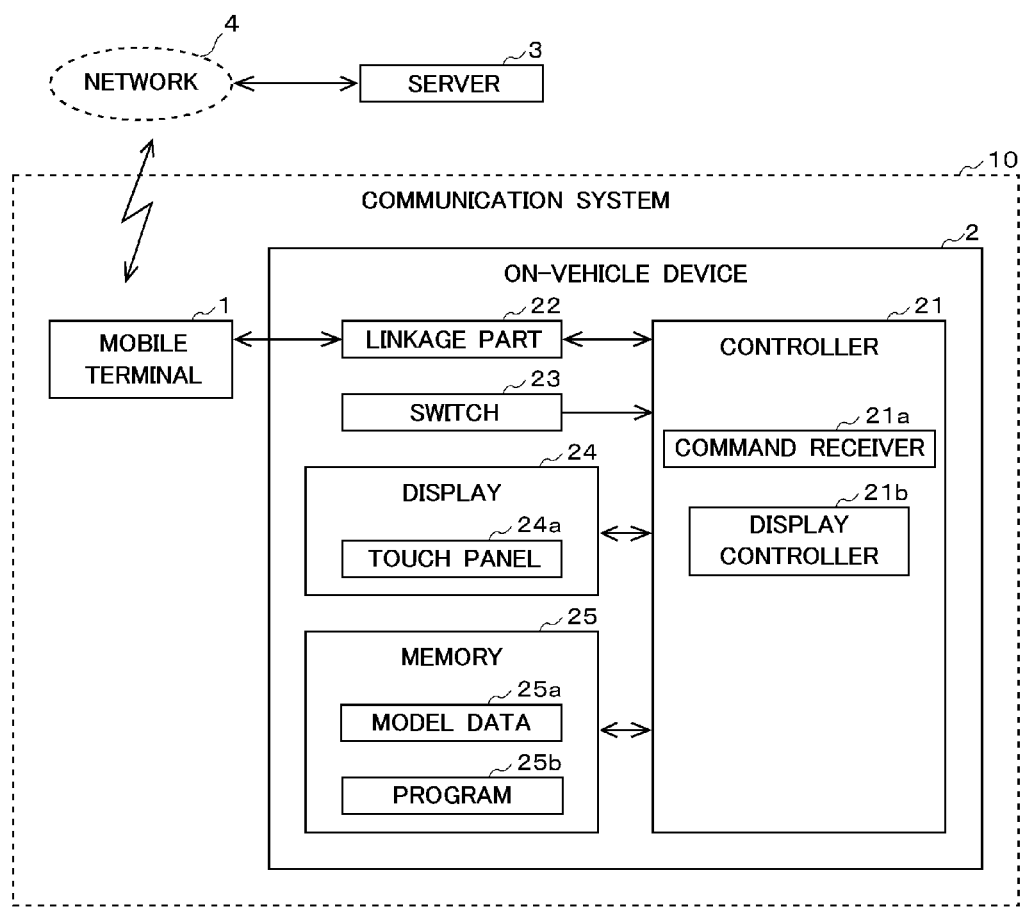
FIG. 3 shows a configuration of an on-vehicle device in the first embodiment.

Next, the configuration of the on-vehicle device 2 is explained. The on-vehicle device 2 is an electronic apparatus mounted on a vehicle. For example, the on-vehicle device 2 is a car navigation apparatus or a car audio apparatus or the like. The on-vehicle device 2 displays the operation screen on the display in stages according to a user's operation. When accepting a plurality of operations in accordance with a predetermined operating procedure, the on-vehicle device 2 displays the operation screen related to the predetermined function. That is, the on-vehicle device 2 is the device which includes multilayer and various kinds of operation screens, corresponds to operations on each operation screen, and performs operations and transition to another operation screen. The on-vehicle device 2 may be a device which is fixedly installed in a vehicle, or a portable device which is brought into the vehicle each time it is used. FIG. 3 shows a configuration of the on-vehicle device 2. The on-vehicle device 2 includes a controller 21 for controlling the entire terminal, a linkage part 22, a switch 23, the display 24, and a memory 25.

The controller 21 is a microcomputer including a CPU, RAM, and ROM. The controller 21 is connected to other configurations included in the mobile terminal 1, and controls the entire device. Each function included in the controller 21 is described later.

The linkage part 22 includes the communication function utilizing low-power radio communication, and communicates information with the on-vehicle device 2 which exists at a short distance. For example, the information communication utilizing a wireless LAN technology such as Wi-Fi (Wireless Fidelity) and a short-distance wireless communication standard such as Bluetooth is performed.

The switch 23 is pressed by the user, and is a mechanically operating push button. That is, the switch 23 is hardware-type switch mechanism. The switch 23 transmits an input signal to the controller 21 when it is pressed by the user.

The display 24 displays various information such as characters and figures, and visually presents the information to the user. For example, the display 24 is a display apparatus such as a liquid crystal display, a plasma display, and an organic EL display. The display 24 includes a touch panel 24a.

The touch panel 24a detects a user's touch on a button area displayed on the display 24, and transmits the detected position information to the controller 21. The touch panel 24a functions as an acceptance part that accepts a user operation on the on-vehicle device 2.

The memory 25 is a memory for storing data. For example, the memory 25 is a non-volatile storage medium such as EEPROM (Electrical Erasable Programmable Read-Only memory), flash memory, and a hard disk drive including a magnetic disk. The memory 25 also stores model data 25a and a program 25b.

The model data 25a are the data indicating the type of the on-vehicle device 2. The type of the device identifies the model year and the model type of the device. Concretely, the type of the device identifies the design of the operation screens, the operation method, and the command system for executing processing, etc. of the corresponding device.

The program 25b is read out by the controller 21, and is the firmware executed so that the controller 21 controls the on-vehicle device 2.

Each function included in the above-described controller 21 is explained. The controller 21 includes a command receiver 21a and a display controller 21b.

The command receiver 21a receives the content from the mobile terminal 1 via the linkage part 22.

The display controller 21b displays the data such as images and characters on the display 24. The display controller 21b also changes the image and the like to be displayed on the display 24 based on the touch position input to the touch panel 24a.

Figure 4:
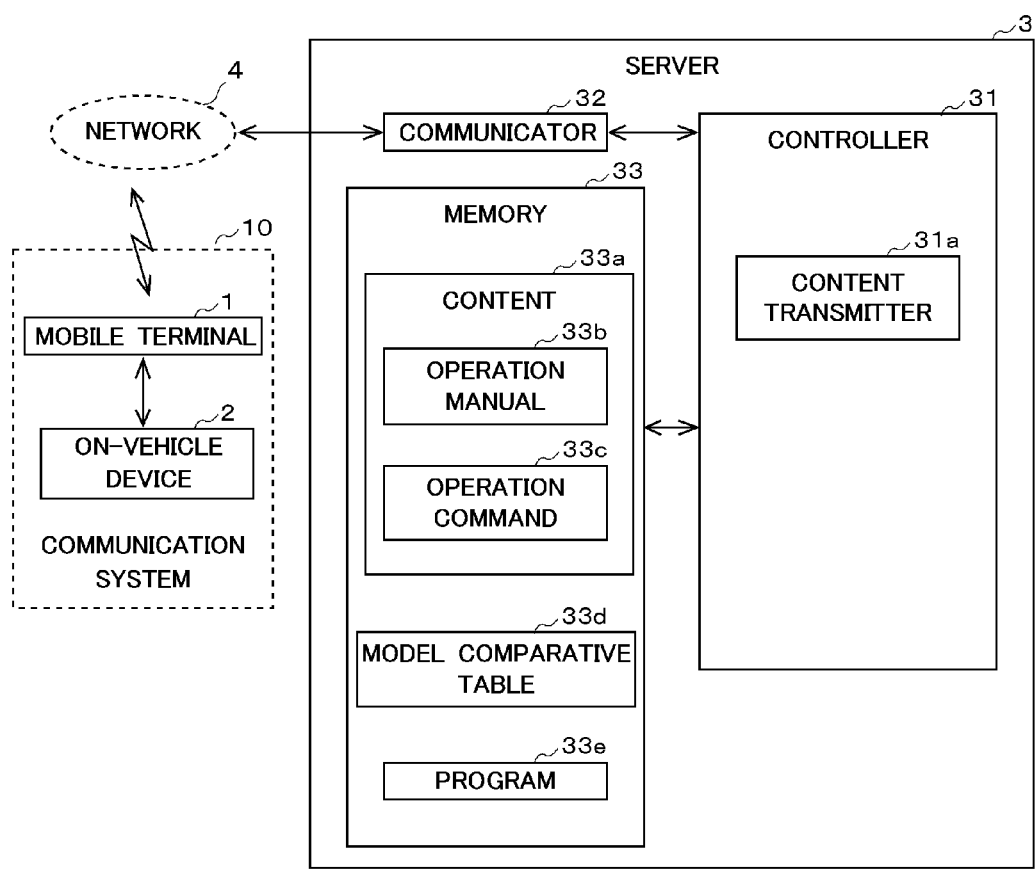
FIG. 4 shows a configuration of a server in the first embodiment.

Next, the configuration of the server 3 is explained. The server 3 is a computer (server apparatus) for providing the mobile terminal 1 with data and services. FIG. 4 shows a configuration of the server 3. The server 3 includes a controller 31, a communicator 32, and a memory 33.

The controller 31 is a microcomputer including a CPU, RAM, and ROM. The controller 31 is connected to other configurations included in the server 3, and controls the entire apparatus. The function included in the controller 31 is described later.

The communicator 32 has a wired or wireless communication function, and communicates information with the mobile terminal 1 by connecting to the network 4.

The memory 33 is a memory for storing data. For example, the memory 33 is a non-volatile storage medium such as a hard disk drive including a magnetic disk. The memory 33 stores a content 33a, a model comparative table 33d, and a program 33e.

The content 33a is the data to be provided for the mobile terminal 1 through the network 4. The content 33a includes an operation manual 33b and an operation command 33c.

The operation manual 33b is the data which includes the characters and figures containing the operation procedure describing the method for operating the on-vehicle device 2. The operation manual 33b is stored for each model of the on-vehicle device 2 in the memory 33.

The operation command 33c is an instruction word for instructing the on-vehicle device 2 to execute a predetermined processing. A single operation command 33c corresponds to a user's single operation on the on-vehicle device 2. When receiving the operation command 33c, the on-vehicle device 2 executes the predetermined processing instructed by the operation command 33c. When instructing the touch on the touch panel, the operation command 33c includes the coordinate information on the display. When instructing the operation of the hardware-type switch of the on-vehicle device 2, the operation command 33c includes the name information of the switch.

There is a case where the operation command 33c is a set (collection) of a plurality of commands according to the operating procedure based on the operation manual. Hereinafter, when "operation command" is mentioned, it may refer to "a set of a plurality of operation commands."

The model comparative table 33d is the data table which contrastively shows the model name of the on-vehicle device 2 and the model name's operation manual and operation command used by the on-vehicle device 2. The controller 31 identifies the operation manual and the operation command used for a predetermined model by referring to the model comparative table 33*d*. The operation manual and the operation command may be sometimes used for a plurality of models. In addition, the operation manual and the operation command may be sometimes used for different models. Therefore, the model name of the on-vehicle device 2 may have a complex contrasting relation with the operation manual and the operation command. Identifying the operation manual and the operation command used for the predetermined model by referring to the foregoing model comparative table 33*d* are useful for the processing for reading out the operation manual and the operation command.

The program 33*e* is read out by the controller 31, and is the firmware executed so that the controller 31 controls the server 3.

The function included in the controller 31 is explained. The controller 31 includes a content transmitter 31*a*. The content transmitter 31*a* reads out the content 33*a* containing the operation manual 33*b* and the operation command 33*c* used for the predetermined model from the memory 33, and edits the content 33*a* into the format transmittable to the mobile terminal 1. Then, the content transmitter 31*a* transmits the edited content 33*a* to the mobile terminal 1 via the communicator 32.

1-3. Processing

Figure 5:
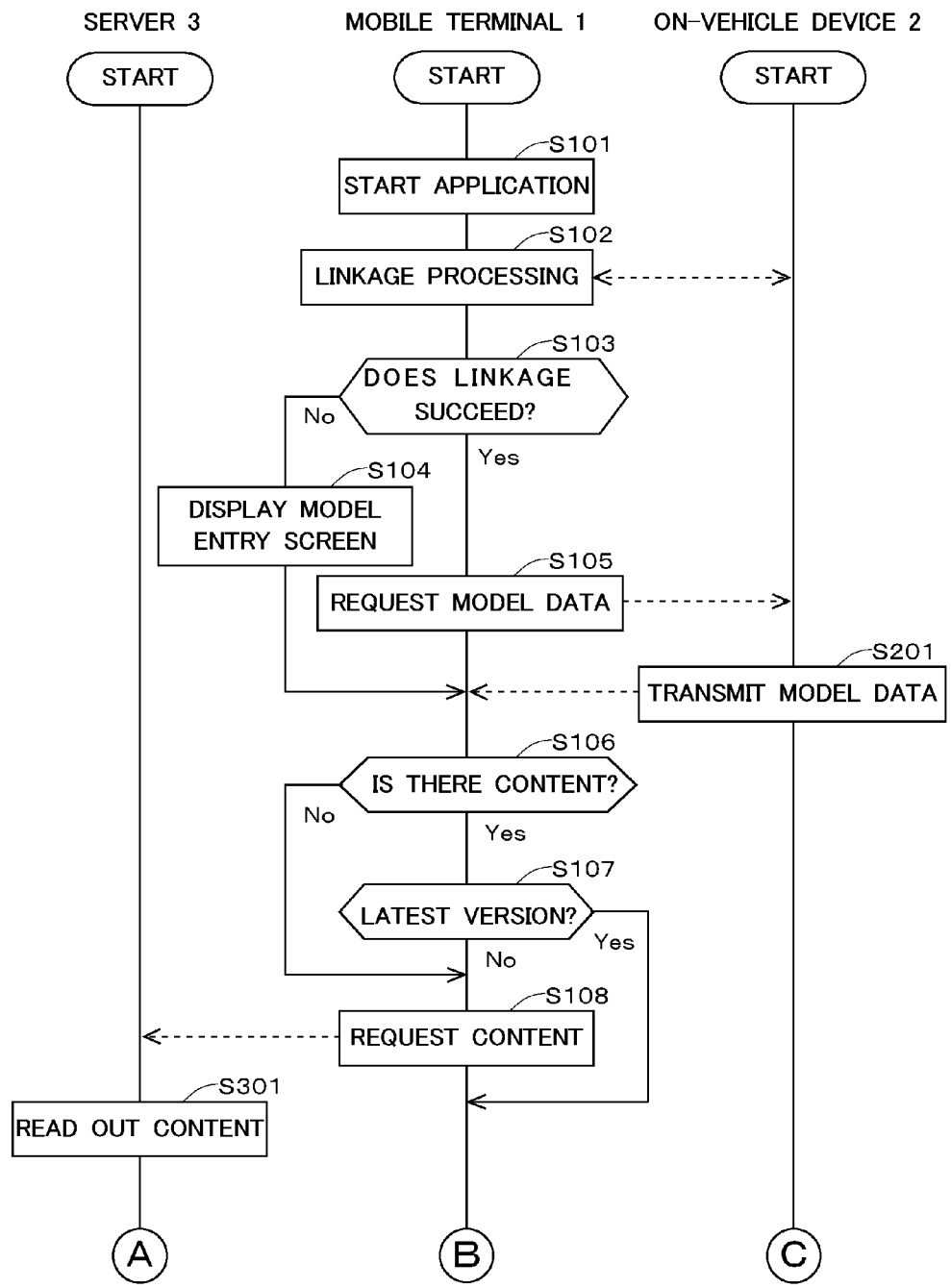
FIG. 5 shows a processing procedure in the first embodiment.
Figure 6:
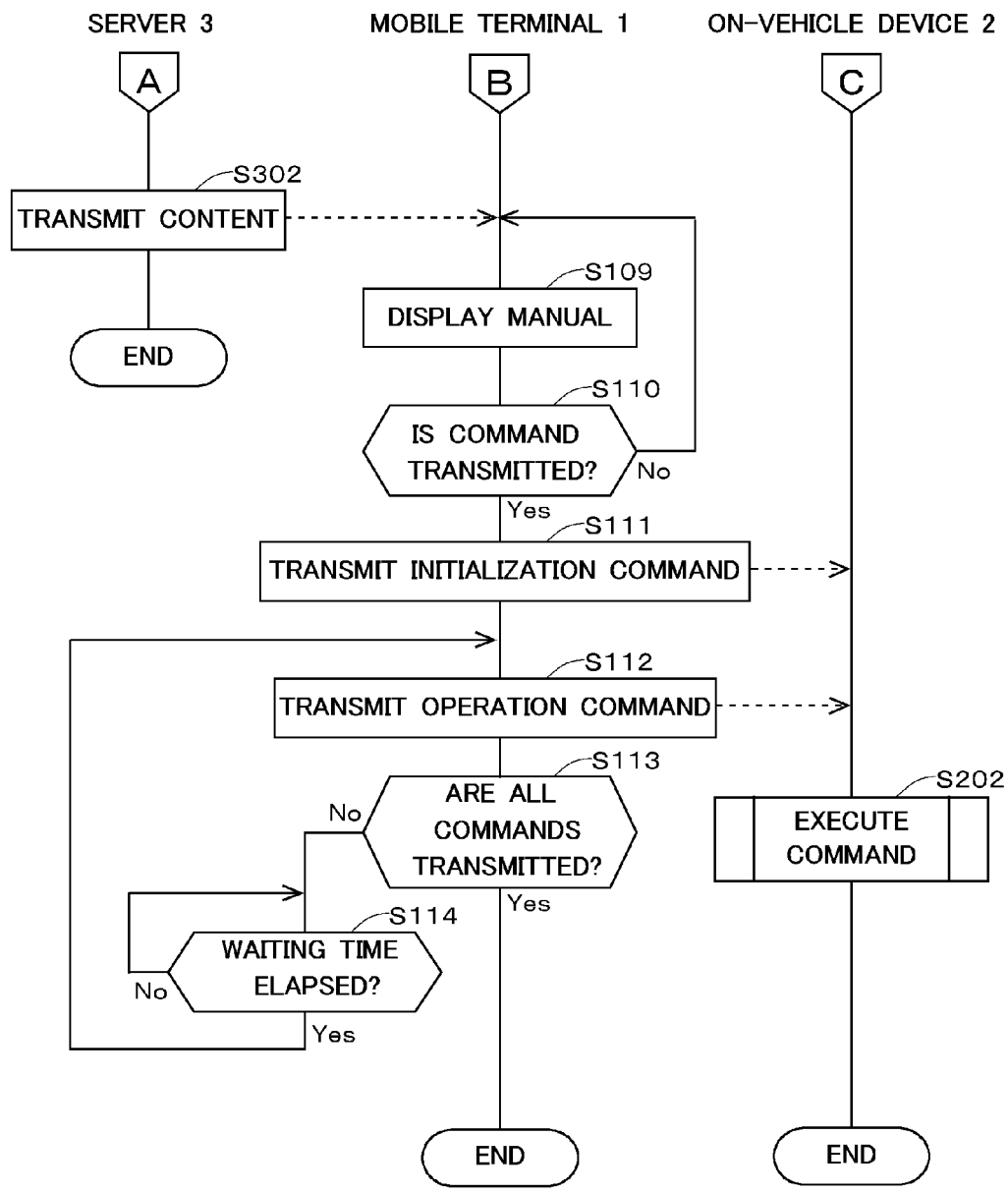
FIG. 6 shows another processing procedure in the first embodiment.

Next, the processing procedures of the mobile terminal 1, the on-vehicle device 2, and the server 3 are explained. Each of FIG. 5 and FIG. 6 shows a processing procedure of the mobile terminal 1, the on-vehicle device 2, and the server 3. This processing is started in the wake of the user's operation on the mobile terminal 1.

First, the user starts a predetermined application by operating the touch panel 13*a* and the like of the mobile terminal 1 (step S101 in FIG. 5). The application is the application for causing the mobile terminal 1 to display the operation manual of the on-vehicle device 2, and for operating the on-vehicle device 2. The user may download the application to the mobile terminal 1 from the predetermined server through the network 4 in advance.

When the application is started, the linkage part 15 of the mobile terminal 1 performs communication linkage processing with the linkage part 22 of the on-vehicle device 2 so as to transmit/receive data to/from the on-vehicle device 2 (step S102).

Next, the information obtaining part 11*a* of the mobile terminal 1 judges whether the linkage processing with the linkage part 22 of the on-vehicle device 2 by the linkage part 15 has succeeded (step S103).

When the information obtaining part 11*a* judges that the linkage processing is failed (No at the step S103), the display controller 11*b* displays the model entry screen of the on-vehicle device 2 on the display 13 (step S104). When the model entry screen is displayed on the display 13, the user checks the model number of the on-vehicle device 2, and enters the model number by use of the touch panel 13*a*. Instead of displaying the model entry screen, the model list may be displayed, and the user may enter the model number by touching the displayed model number.

On the other hand, when the information obtaining part 11*a* judges that the linkage processing between the mobile terminal 1 and the on-vehicle device 2 has succeeded (Yes at the step S103), or when the model number is entered by the user, the information obtaining part 11*a* of the mobile terminal 1 requests the on-vehicle device 2 to transmit the model data via the linkage part 15 (step S105).

When receiving the request for transmitting the model data from the mobile terminal 1, the controller 21 of the on-vehicle device 2 reads out the model data 25*a* from the memory 25, and transmits the model data 25*a* to the mobile terminal 1 (step S201).

When the model data 25*a* is transmitted to the mobile terminal 1, the information obtaining part 11*a* judges whether the content corresponding to the model data 25*a* is already stored in the memory 14 (step S106).

When judging that the content is stored in the memory 14 (Yes at the step S106), the information obtaining part 11*a* judges whether the content is the latest version (step S107). The version-number information of the latest version may be separately received from the server 3. For example, immediately after the starting of the application, the mobile terminal 1 may receive the version-number information of the latest version from the server 3.

When judging that the content is not stored in the memory 14 (No at the step S106), and when judging that the content is not the latest version (No at the step S107), the information obtaining part 11*a* requests the server 3 to transmit the content (operation manual and operation command) used for the on-vehicle device 2 via the communicator 12 (step S108). At this time, when judging that the content is the latest version (Yes at the step S107), the information obtaining part 11*a* does not request the server 3 to transmit the content, and performs the step S109 (FIG. 6) described later.

When receiving the content transmission request from the mobile terminal 1, the content transmitter 31*a* of the server 3 refers to the model comparative table 33*d* in the memory 33, and reads out the content 33*a* containing the operation manual and the operation command used for the model from the memory 33 (step S301).

The content transmitter 31*a* transmits the readout content 33*a* to the mobile terminal 1 (step S302 in FIG. 6).

When receiving the content 33*a* including the operation manual and the operation command from the server 3, the information obtaining part 11*a* of the mobile terminal 1 causes the memory 14 to store the content 33*a*. That is, the memory 14 stores the operation manual 33*b* which is the operating procedure and a plurality of commands respectively corresponding to a plurality of operations following the operating procedure. Then, the display controller 11*b* causes the display 13 to display the operation manual 33*b* included in the content 33*a* (step S109).

The initial display of the operation manual 33*b* on the display 13 is the operation menu screen. The user selects a desired operation from the operation menu screen. The operation menu is preferably displayed with the menu classified into functional items. This is because the user can intuitively select a desired operation. A functional item is an item suitable for a use situation or a usage scene. Examples are, "Use the navigation system," "Operate the audio," and "Make a phone call," etc.

Figure 8:
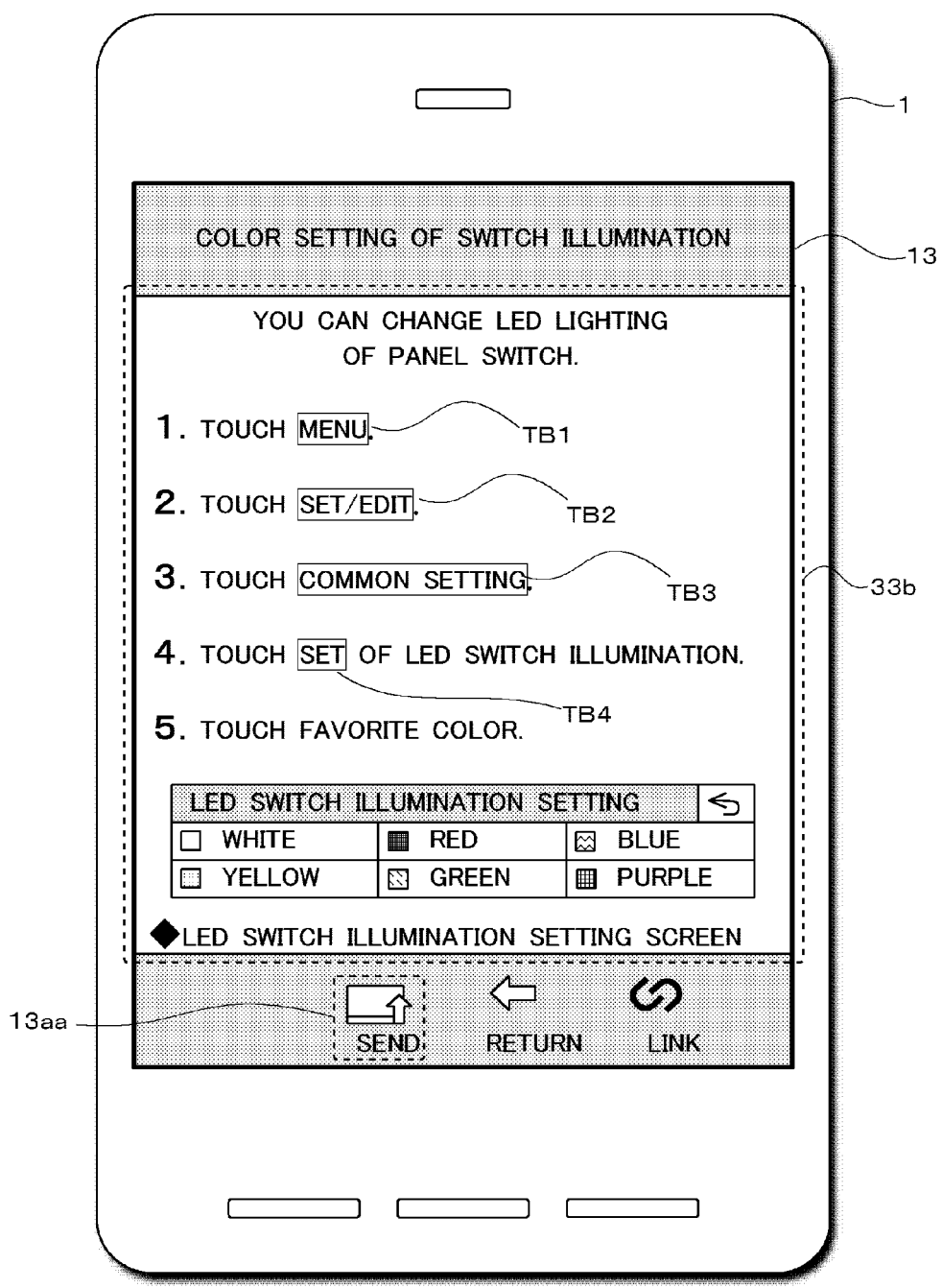
FIG. 8 shows an example of displaying an operation manual on the mobile terminal.

Here, an example of the operation manual 33*b* displayed on the display 13 of the mobile terminal 1 is explained. FIG. 8 is an example of the screen on which the operation manual 33*b* is displayed on the display 13 of the mobile terminal 1. The operation manual 33*b* shown in FIG. 8 indicates what button should be operated by the user in order to set the color of the switch illumination according to the user's preference. That is, FIG. 8 indicates that the user reaches the screen for setting the color of the switch illumination by pressing the "MENU" switch (TB1) and sequentially touching the "SET/EDIT"

(TB2), "COMMON SETTING" (TB3), and "SET" (TB4) which are touch panel buttons in order to set the color of the switch illumination. In this way, the user can refer to the operation manual 33b of the on-vehicle device 2 on the display 13 of the mobile terminal 1.

FIG. 6 is referenced again. When the operation manual 33b is displayed on the display 13, the command transmitter 11c of the mobile terminal 1 judges whether to transmit the operation command corresponding to the displayed operation manual to the on-vehicle device 2 (step S110). The judgment is made by the user depending on whether the operation for transmitting the operation command to the on-vehicle device 2 is input to the touch panel 13a.

When the command transmitter 11c judges that the operation command is not transmitted to the on-vehicle device 2 (No at the step S110), the display controller 11b causes the display 13 to continuously display the operation manual 33b.

On the other hand, when judging that the operation command is transmitted to the on-vehicle device 2 (Yes at the step S110), the command transmitter 11c transmits an initialization command to the on-vehicle device 2 (step S111). Whether to transmit the initialization command to the on-vehicle device 2 may be judged by the command transmitter 11c, for example, based on whether the user touches a predetermined touch panel button 13aa shown in FIG. 8.

The initialization command is the command for shifting to the screen that is a basis of an operation. When each operation command includes a position coordinate of the touch panel, the command is executed from the reference screen, in order to match the operation button position shown on the touch panel and the coordinate position including the operation command on the display.

At the time when the initialization command is transmitted, what screen is displayed on the display is unclear. Thus, the coordinate position of the button for shifting to the reference screen is also unknown. Therefore, the initialization command includes the name information of the hardware switch 23 of the on-vehicle device 2, instead of the coordinate position of the touch panel 13a. For this reason, the controller 21 of the on-vehicle device 2 receiving the initialization command performs the processing to be performed when the hardware switch 23 is pressed. The reference screen is, for example, the screen showing the present position of the vehicle in navigation.

After transmitting the initialization command, the command transmitter 11c subsequently transmits the operation command to the on-vehicle device 2 (step S112). When there are plural operation commands to be transmitted to the on-vehicle device 2, the command transmitter 11c transmits a single operation command to be executed firstly among a series of operating procedures. For example, it is the operation command executed by pressing the switch "TB1" in FIG. 8.

When the command receiver 21a of the on-vehicle device 2 receives the operation command, the display controller 21b executes the operation command (step S202), and updates the display on the display 24. The processing details of the step S202 is described later.

Next, the command transmitter 11c judges whether all operation commands relating to a series of operations are transmitted to the on-vehicle device 2 (step S113).

When judging that all operation commands are not transmitted (No at the step S113), the command transmitter 11c refers to the timer 11d, and detects the elapsed time after transmitting the latest operation command.

Next, the command transmitter 11c judges whether the elapsed time after transmitting the latest operation command has passed a predetermined waiting time (step S114). The waiting time is the time interval at which the screen changes when a plurality of operation commands are executed. For example, the waiting time is one second. However, the waiting time may be the time by which the user can grasp the screen transition.

When judging that the elapsed time after transmitting the latest operation command has not passed the predetermined waiting time (No at the step S114), the command transmitter 11c judges the elapse of the waiting time again. That is, until the waiting time elapses, the command transmitter 11c waits the transmission of the operation command.

On the other hand, when judging that the elapsed time after transmitting the latest operation command has passed the predetermined waiting time (Yes at the step S114), the command transmitter 11c transmits the operation command to the on-vehicle device 2 (step S112). At this time, the operation command to be transmitted to the on-vehicle device 2 is the command to be executed next among a series of operation commands. For example, the operation command is the command executed by touching the button "TB2" in FIG. 8.

Until the command transmitter 11c transmits all of the series of operation commands respectively, that is, until the command transmitter 11c transmits the commands corresponding to "TB1" to "TB4" shown in FIG. 8, the above-described step S112, step S113, step S114, and step S202 are repeatedly performed. Thus, the command transmitter 11c intermittently transmits each of the commands to the on-vehicle device 2 in accordance with the operating procedure depending on the waiting time, and each of the commands is intermittently executed on the on-vehicle device 2.

When the command transmitter 11c judges that all operation commands are transmitted (Yes at the step S113), this processing ends.

Next, details of the processing in the step S202 of the on-vehicle device 2 are explained. The step S202 is performed every time the command receiver 21a of the on-vehicle device 2 receives the initialization command and the operation command from the mobile terminal 1.

Figure 7:
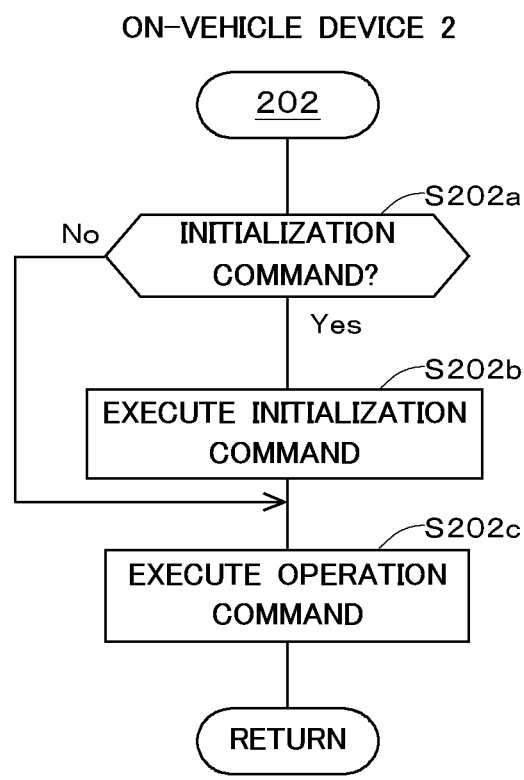
FIG. 7 shows another processing procedure in the first embodiment.

When the processing is started, the command receiver 21a judges whether the command receiver 21a has received the initialization command (step S202a in FIG. 7). When the received command includes the name of the hardware switch to be operated, the command receiver 21a determines that the received command is the initialization command. When the received command includes the coordinate of the touch switch to be operated, the command receiver 21a judges that the received command is the operation command. When the command receiver 21a judges that the initialization command is received (Yes at the step S202a), the display controller 21b executes the processing which is executed when the switch of the name included in the initialization command is pressed (step S202b). For example, as mentioned above, it is the processing for shifting to the screen showing the present position of the vehicle in navigation.

On the other hand, when the command receiver 21a judges that the initialization command is not received (No at the step S202a), the display controller 21b executes the processing which is executed when the touch switch of the coordinate information included in the operation command is touched (step S202c). When the display controller 21b executes the operation command, this processing ends, and returns to the processing in FIG. 6.

Next, examples of the screen transition on the display 24 of the on-vehicle device 2 when the command transmitter 11c transmits the series of operation commands to the on-vehicle device 2 are explained.

Figure 9:
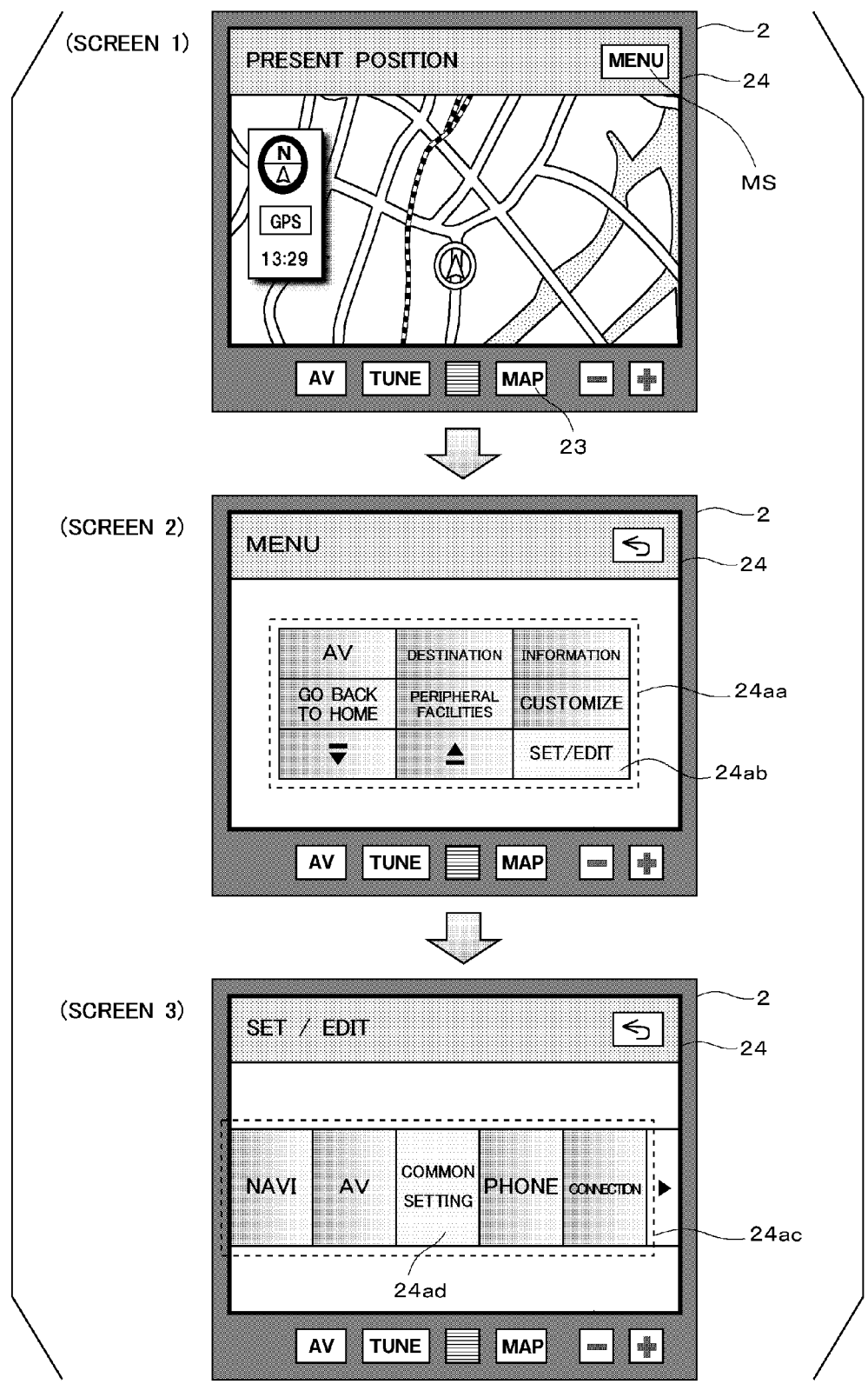
FIG. 9 shows an example of a screen transition of the on-vehicle device.
Figure 10:
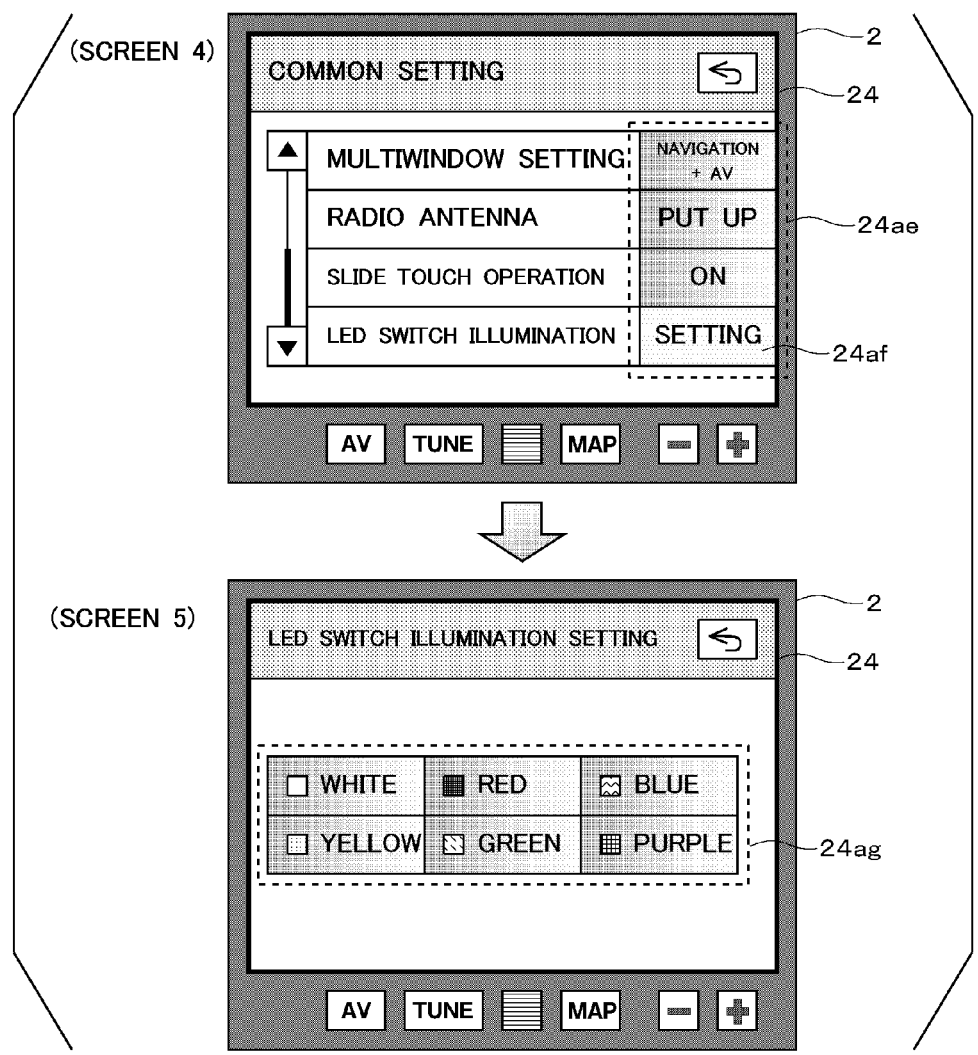
FIG. 10 shows another example of the screen transition of the on-vehicle device.

FIG. 9 and FIG. 10 are examples of the screen transition on the display 24 of the on-vehicle device 2 when the series of operation commands to be operated by the user are respectively transmitted in order to set the color of the switch illumination according to the user's preference. From FIG. 9 through FIG. 10, the screen sequentially changes from Screen 1 to Screen 5 according to the execution of the operation command. That is, the screen changes from Screen 1 which is the operation starting screen to Screen 5 which is the operation screen related to the predetermined function.

The screen shown as "Screen 1" is the reference screen. Screen 1 is the screen on which the command corresponding to pressing of "MAP" switch 23 of the on-vehicle device 2 is executed. In order to match the position of the operation button shown on the touch panel and the coordinate position including the operation command, the on-vehicle device 2 executes the initialization command, and the screen shifts to the predetermined reference screen before execution of the operation command. The execution of the operation command is started from the reference screen.

Next, the screen shown as "Screen 2" is the screen on which the command corresponding to the touch operation of a "MENU" switch MS is executed on the reference screen of Screen 1. On the menu screen, a plurality of touch panel buttons 24aa are displayed. On Screen 2, when the waiting time has elapsed, the next operation command is transmitted. When the command corresponding to the touch on a "SET/EDIT" button 24ab is executed, the screen shifts to Screen 3. At this time, the operation button to be executed is highlighted on the screen. The same applies to the following screen transition. By the highlighted operation button, the user can grasp what operation button should be operated on each screen.

On the SET/EDIT screen shown by "Screen 3," a plurality of touch panel buttons 24ac to be set are displayed. On Screen 3, when the waiting time has elapsed, the next operation command is transmitted. When the command corresponding to the touch on a "COMMON SETTING" button 24ad is executed, the screen further shifts to Screen 4 (FIG. 10).

On the common setting screen shown by "Screen 4," the names of the functions to be set and a plurality of touch panel buttons 24ae corresponding to each function are displayed. On Screen 4, when the waiting time has elapsed, the next operation command is transmitted. When the command corresponding to the touch on a "SET" button 24af which corresponds to "LED switch illumination" is executed, the screen further shifts to Screen 5.

On the illumination setting screen shown by "Screen 5," a plurality of touch panel buttons 24ag indicating the configurable colors are displayed. The user may touch the touch panel button indicating a desired color on Screen 5 in order to set the color of the switch illumination according to his/her preference.

In this way, the operation screen reaches Screen 5 for setting the color of the switch illumination according to the user's preference. That is, each operation screen shifts from Screen 1 to Screen 5 without omitting the intermediate process. Each operation screen also shifts at every elapse of the waiting time when each operation command is transmitted. Further, the operation button to be touched by the user is highlighted on each screen. Thus, the user can easily grasp what button is operated on each screen.

As described above, the mobile terminal 1 in the first embodiment intermittently transmits each of the operation commands which corresponds to each of the user operations in accordance with the operation manual to the on-vehicle device 2, in accordance with the operation manual. Thus, the plurality of commands are intermittently executed on the on-vehicle device 2 in accordance with the operating procedure. For this reason, the operation screen is displayed in stages, and the user can check and understand the operating procedure until an intended operation screen is displayed on the display 24.

Further, since the user can recognize what a series of operations should be performed on the screen in order to reach a desired screen, the user can be skilled in operations of the on-vehicle device 2.

Further, since the user is automatically guided to the operation screen of the desired function with fewer touch operations, the convenience of the on-vehicle device 2 is improved.

Further, the user can eliminate the trouble of looking through a bound manual booklet and of operating the on-vehicle device 2 while collating the operation screen.

Further, since the command and the touch position used by the on-vehicle device 2 are used to operate the on-vehicle device 2, the on-vehicle device 2 may require a minor design change.

Further, since the operation screen related to the predetermined function is displayed, the user can determine the start of operation and the final operation (confirmation) to the operation screen by him/herself. Furthermore, operation patterns at the time of referring to the manual are not increased.

2. Second Embodiment

2-1. Outline

Next, the second embodiment is explained. In the above-described first embodiment, the mobile terminal 1 transmits the operation command to the on-vehicle device 2 at every elapse of the waiting time. Second embodiment allows a user to change the waiting time. The waiting time for transmitting the operation command is also the time when the screen is updated on the on-vehicle device 2. By allowing the user to change the waiting time, the screen of the on-vehicle device 2 is updated at intervals desired by the user. Thus, the user can recognize the screen transition more easily, and the proficiency in operations of the on-vehicle device 2 becomes easier. Since the second embodiment includes the configuration and the processing similar to the first embodiment, hereinafter, the difference from the first embodiment is mainly explained.

2-2. Configuration

Figure 11:
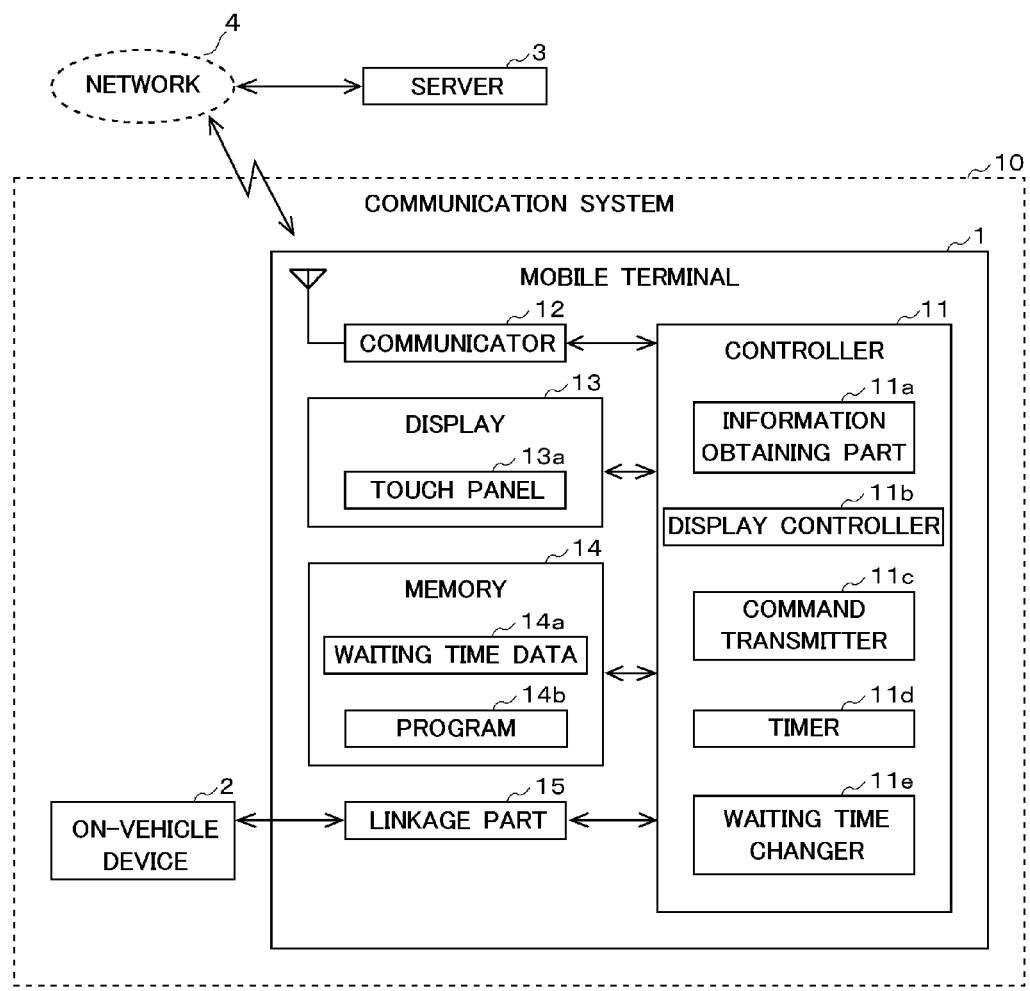
FIG. 11 shows a configuration of the mobile terminal in the second embodiment.

First, the configuration of a mobile terminal 1 in the second embodiment is explained. FIG. 11 shows the configuration of the mobile terminal 1 in the second embodiment. The main difference from the first embodiment is that a controller 11 of the mobile terminal 1 includes a waiting time changer 11e. Other configurations are configured and function as well as the first embodiment.

The waiting time changer 11e changes waiting time data 14a stored in a memory 14 according to a user's input operation on a touch panel 13a. That is, the waiting time changer 11e changes a transmission interval at which each of a plurality of commands are transmitted, according to the setting by the user. When the waiting time data 14a are changed by the waiting time changer 11e, a command transmitter 11c transmits an operation command based on the changed waiting time.

2-3. Processing

Figure 12:
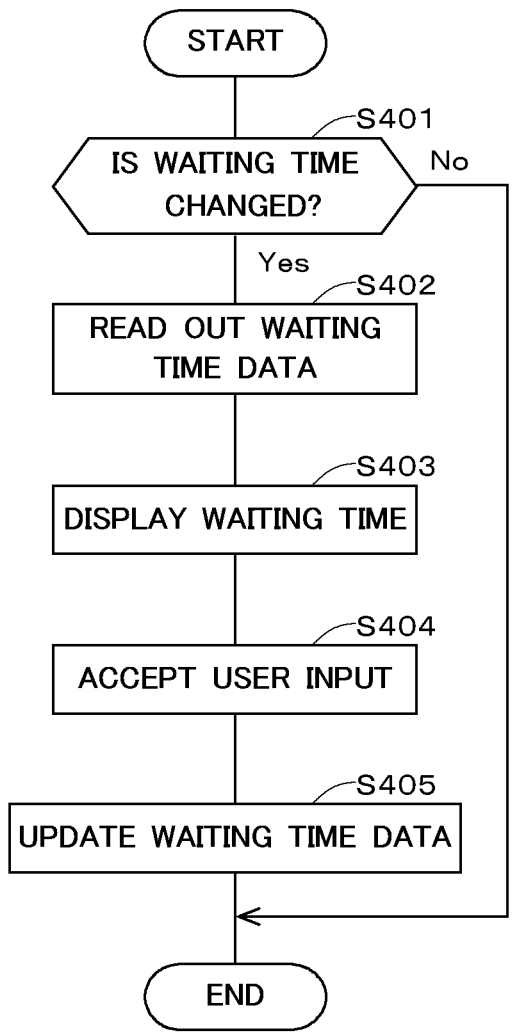
FIG. 12 shows a processing procedure of the mobile terminal in the second embodiment.

Next, the processing procedure in the second embodiment is explained. FIG. 12 shows a processing procedure for changing the waiting time at the mobile terminal 1 in the second embodiment.

The waiting time changer 11e judges whether to change the waiting time based on the input operation to the touch panel 13a by the user (step S401). By causing the touch panel 13a to display a predetermined button, the waiting time changer 11e may make the judgment whether the user touches the button.

When the waiting time changer 11e judges that the waiting time is not changed (No at the step S401), this processing ends. As the user does not wish to change the waiting time, it is no longer necessary to continue the processing for changing the waiting time.

When judging that waiting time is changed (Yes at the step S401), the waiting time changer 11e starts the acceptance of the change input of the waiting time to the touch panel 13a by the user.

The waiting time changer 11e reads out the waiting time data 14a from the memory 14 (step S402), a display controller 11b causes a display 13 to display the present waiting time (step S403). Thus, the user can grasp the currently set waiting time, and can judge how much time should be changed from the present waiting time.

Next, the waiting time changer 11e accepts the change input operation of the waiting time by the user (step S404). By causing the touch panel 13a to display the predetermined button, the acceptance of the change input operation may be judged depending on the presence of the touch operation to the button. The waiting time displayed on the display 13 is preferably changed according to the touch operation to the button by the user. This is because the user can perform the change input operation while referring to the waiting time set, and the operation for setting the waiting time by the user is facilitated.

Figure 13:
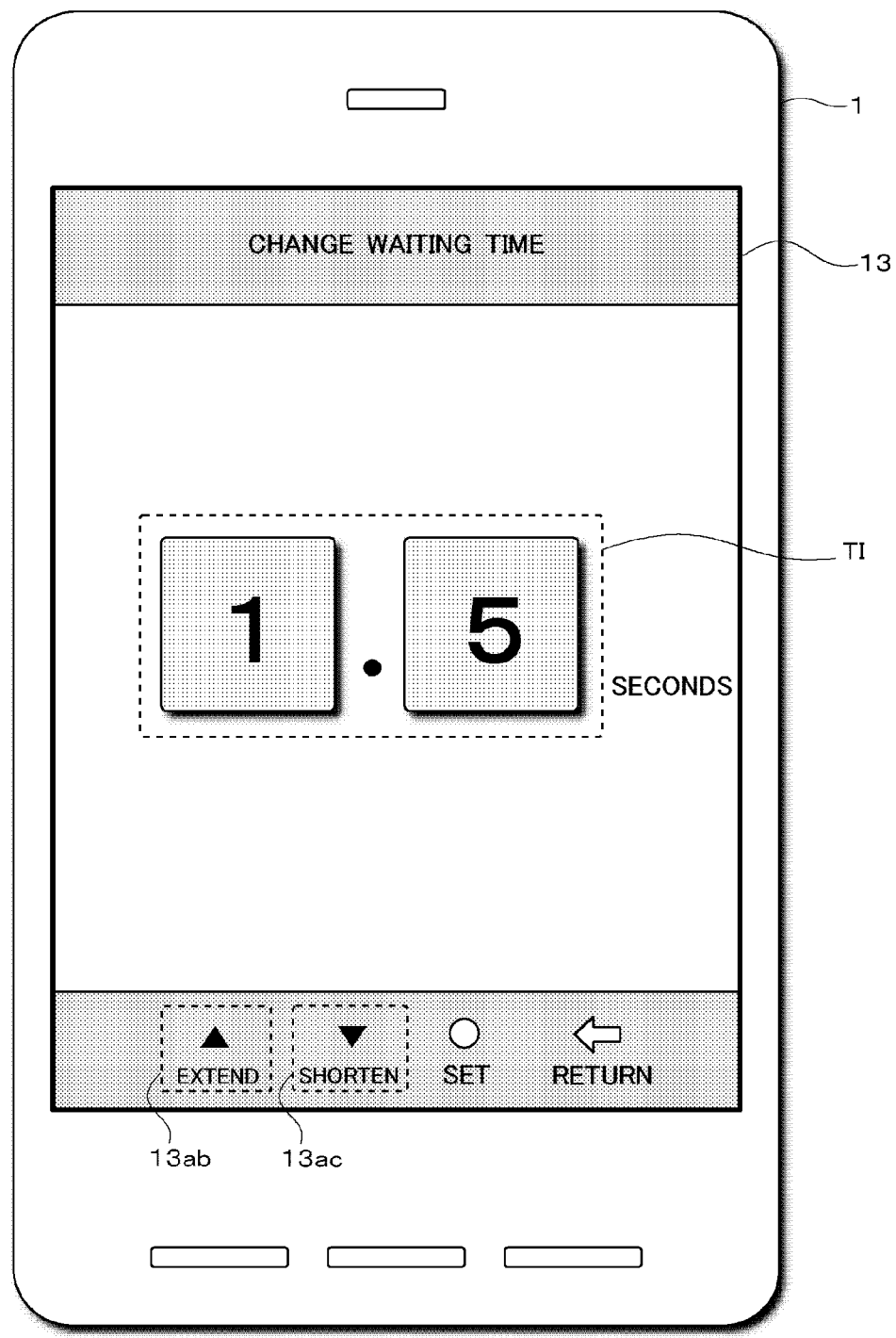
FIG. 13 shows an example of a screen for changing a waiting time.

FIG. 13 shows an example of the screen accepting the change input of such a waiting time. A waiting time TI which is currently set is displayed on the display 13 of the mobile terminal 1. By touching a change button 13ab or a change button 13ac for the waiting time TI, the user can change the waiting time to the desired waiting time on the display 13 while referring to the displayed waiting time TI.

FIG. 12 is referenced again. When the change input of the waiting time by the user is completed, the waiting time changer 11e updates the waiting time data 14a (step S405). That is, the waiting time changer 11e overwrites the waiting time data 14a in the memory 14 with the waiting time data changed by the user. When the waiting time data 14a are updated by the waiting time changer 11e, this processing ends.

As described above, the second embodiment allows the user to change the waiting time. By allowing the user to change the waiting time, a command can be transmitted to an electronic apparatus for execution at intervals desired by the user. Thus, since the screen of the on-vehicle device 2 is updated at intervals desired by the user, the user can recognize the screen transition more easily, and the proficiency in operations of the on-vehicle device 2 becomes easier.

3. Third Embodiment

3-1. Outline

Next, the third embodiment is explained. In the above-described first embodiment, the mobile terminal 1 transmits the operation command to the on-vehicle device 2 at every elapse of the waiting time. On the other hand, in the third embodiment, the mobile terminal 1 transmits the operation command to the on-vehicle device 2 for each operation by a user. Thus, at the desired timing, the user can transmit the operation command, that is, the user can perform the transition of the operation screen. Therefore, the user can examine and analyze the screen which is particularly desired to be learned by spending a sufficient time, and can improve the operation ability of the on-vehicle device 2. Since the third embodiment includes the configuration and the processing similar to the first embodiment, hereinafter, the difference from the first embodiment is mainly explained.

3-2. Configuration

Figure 14:
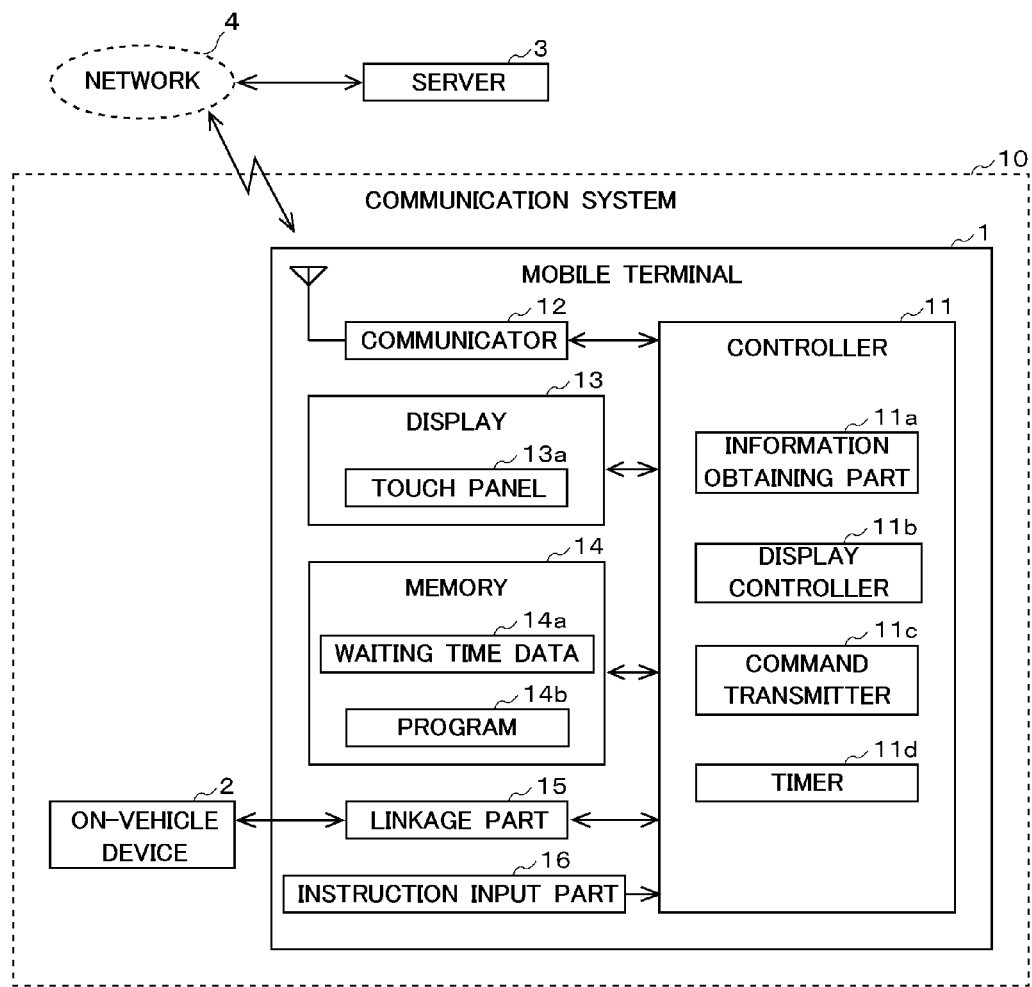
FIG. 14 shows a configuration of the mobile terminal in the third embodiment.

First, the configuration of a mobile terminal 1 in the third embodiment is explained. FIG. 14 shows a configuration of the mobile terminal 1 in the third embodiment. The main difference from the first embodiment is that the mobile terminal 1 includes an instruction input part 16. Other configurations are configured and function as well as the first embodiment.

The instruction input part 16 is pressed by the user, and is a mechanically operating push button. When being pressed by the user, the instruction input part 16 transmits an input signal to a controller 11. The user can input an instruction for transmitting the operation command to the mobile terminal 1 by pressing the instruction input part 16. The instruction input part 16 may be configured with a touch button on a touch panel 13a. In this case, the mechanical push button (hardware-type switch) can be omitted.

3-3. Processing

Figure 15:
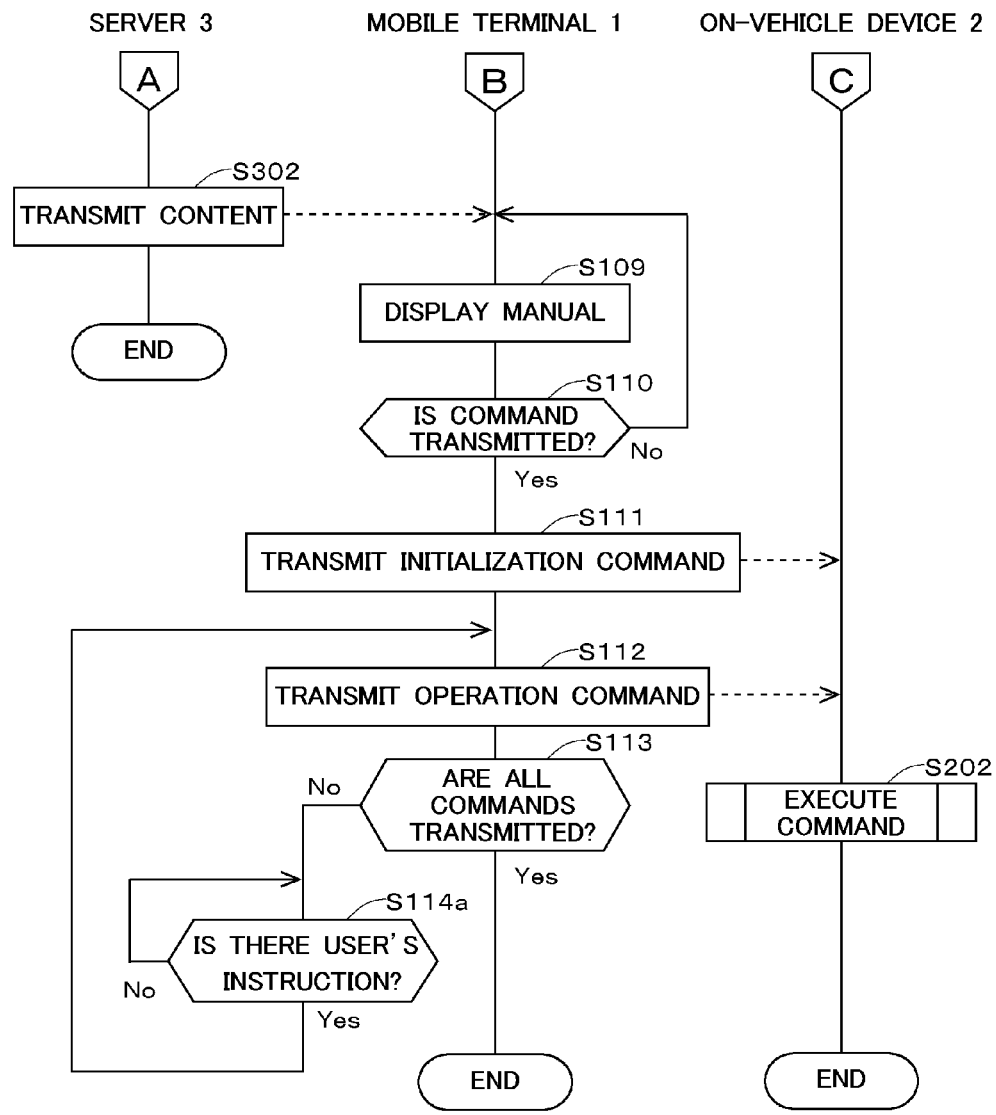
FIG. 15 shows a processing procedure in the third embodiment.

Next, the processing procedure in the third embodiment is explained. FIG. 15 shows a processing procedure in the third embodiment. The main difference from the first embodiment is that the mobile terminal 1 executes the processing of step S114a in place of the step S114. Other processing is executed and functions as well as the first embodiment.

In the step S113, when judging that all operation commands relating to the operating procedure are not transmitted (No at the step S113), a command transmitter 11c judges whether there is an instruction for transmitting the operation command from the user (step S114a). That is, the command transmitter 11c judges whether the instruction input part 16 transmits the input signal to the controller 11.

When judging that there are no instructions for transmitting the operation command from the user (No at the step S114a), the command transmitter 11c judges whether there is an instruction for transmitting the operation command again. Afterward, the command transmitter 11c repeatedly makes a judgment until the transmission instruction is given. That is, the mobile terminal 1 is in a standby state of the transmission instruction.

On the other hand, when judging that there is an instruction for transmitting the operation command from the user (Yes at the step S114a), the command transmitter 11c transmits the operation command. At this time, the command transmitter 11c transmits a single operation command to be executed firstly among a series of operation commands. That is, every time the user's instruction is input to the instruction input part 16, the command transmitter 11c transmits a single command among a plurality of commands to an on-vehicle device 2, in accordance with the order of the operating procedures following an operation manual. The subsequent processing is just as the processing procedure in the first embodiment is explained.

As described above, in the third embodiment, the mobile terminal 1 transmits the operation command to the on-vehicle device 2 for each operation by the user. Thus, a command can be transmitted to an electronic apparatus for execution at the timing desired by the user. That is, since the user can change the operation screen at the desired timing, the user can examine and analyze the screen which is particularly desired to be learned by spending the sufficient time, and can improve the operation ability of the on-vehicle device 2.

Furthermore, the third embodiment is effective, for example, when retailers and car dealers, etc. of the on-vehicle device 2 explain the operations of the on-vehicle device 2 to a customer. This is because they can change the operation screen by transmitting the operation command, after confirming the customer's understanding of the operation explanation.

4. Modification

The embodiments of the invention are explained above. However, the invention is not limited to the embodiments described above. Various modifications are possible. Hereinafter, examples of those modifications are explained. All embodiments including the aforementioned embodiments and modifications explained below can be arbitrarily combined.

Figure 16:
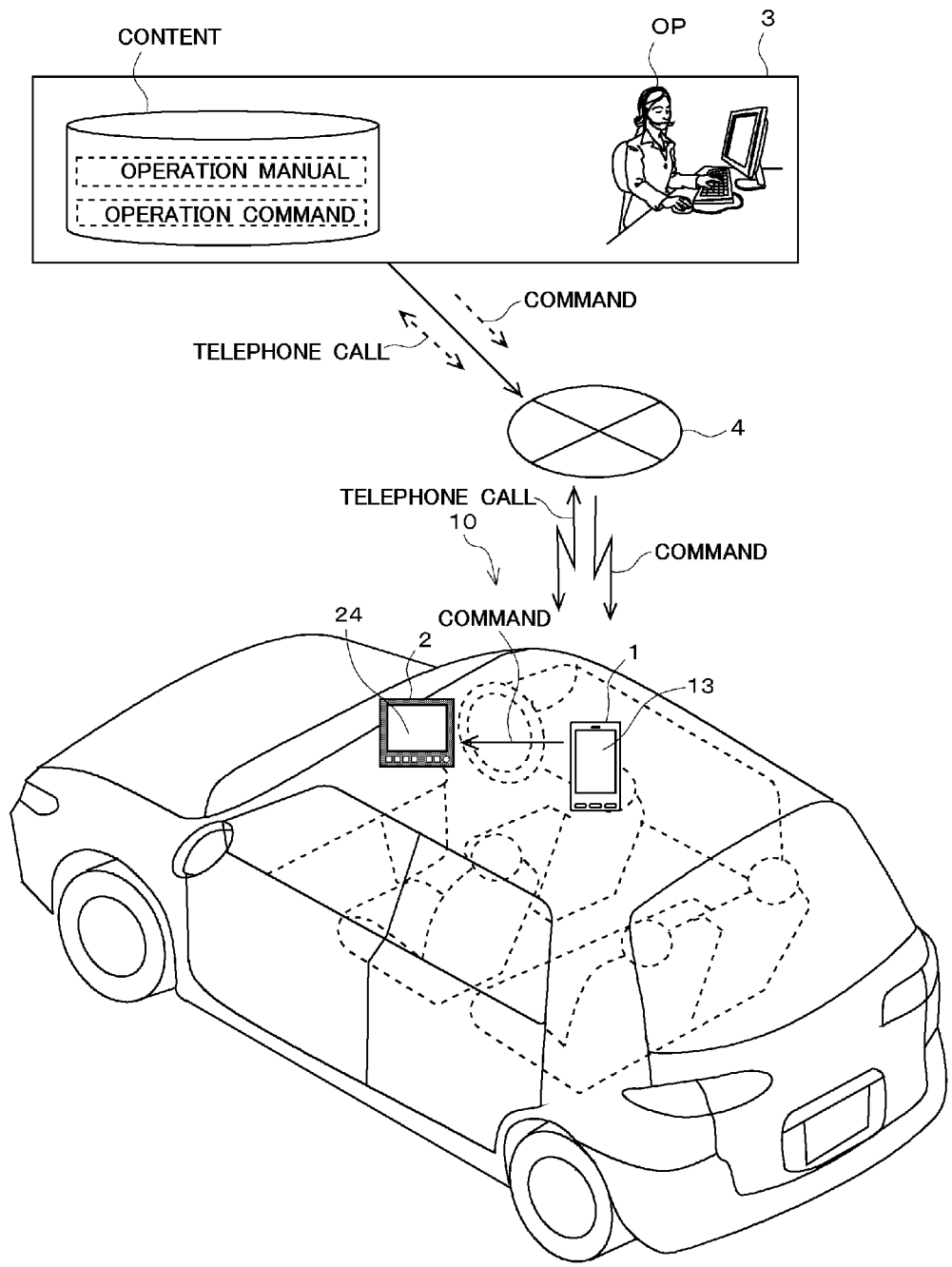
FIG. 16 shows a modification of the communication system.

In the embodiment described above, the mobile terminal 1 obtains the content from the server 3, and transmits the operation command to the on-vehicle device 2. On the other hand, in this modification, a user and a server 3 perform communication with each other, and the server 3 selects and transmits an appropriate operation command. FIG. 16 shows such a modification.

In this modification, an operator OP is stationed in the server 3, and the operator OP makes a phone call with the user of a mobile terminal 1 through a network 4. The operator OP grasps the contents of the operation desired by the user through the call with the user. Then, the operator OP selects an appropriate operation command, and transmits the operation command to the mobile terminal 1. It is, so to speak, the remote control of an on-vehicle device 2 by the operator OP.

When receiving the operation command, the mobile terminal 1 transmits the received operation command to the on-vehicle device 2. When the on-vehicle device 2 executes the received operation command, the screen desired by the user is displayed on a display 24. In this case, the user does not have to refer to an operation manual on a display 13 of the mobile terminal 1, and saves the trouble of operating a touch panel. The on-vehicle device 2 may include a means for receiving the operation command, and may directly receive the operation command from the server 3 without through the mobile terminal 1.

Another modification is explained. In the embodiment described above, the mobile terminal 1 intermittently transmits a plurality of commands to the on-vehicle device 2. However, the mobile terminal 1 may transmit the plurality of operation commands all together. In this case, the on-vehicle device 2 receiving the operation commands may execute each of the operation commands intermittently.

Further, in the embodiment described above, the operation screen is displayed in stages according to the user operation, and the operation screen related to a predetermined function ("LED switch illumination setting screen") is displayed when a plurality of user operations following a predetermined operating procedure are received. However, in place of displaying the operation screen related to the predetermined function, the predetermined function may be performed. For the function unnecessary to be selected by the user, it is easy to perform the predetermined function without displaying the operation screen related to the predetermined function. To perform the predetermined function is, for example, to perform the navigation by designating one's home as a destination in the navigation function. In the operation for designating one's home as a destination, as the destination is determined, it is not necessary to display the operation screen.

Further, in the embodiment described above, the mobile terminal 1 receives the content including the operation manual and the operation command from the server 3, and transmits the content to the on-vehicle device 2. However, the on-vehicle device 2 may store the content in advance. In this case, the user operates the on-vehicle device 2 to cause the on-vehicle device 2 to display the operation manual. The on-vehicle device 2 may sequentially execute the operation command in accordance with the operating procedure, and may display the screen in stages to the operation screen desired by the user.

Further, in the embodiment described above, the operation manual is displayed, and the user inputs an instruction. However, the user may input the name of a desired screen by voice. In this case, the mobile terminal 1 may include a microphone and a voice analysis function.

Further, in the embodiment described above, the on-vehicle device 2 is explained as the device mounted on a vehicle. However, the on-vehicle device 2 may be the device which is not mounted on a vehicle. For example, the device is a consumer electronic device such as a personal computer, a TV, and a microwave oven. In short, any device that includes a touch panel and requires a plurality of operations until a desired screen is displayed may be used.

Further, the embodiment described above is explained by use of the touch panel with which the user performs an input operation. However, it is not always necessary to use the touch panel. That is, any device operated by a pointing device such as a pointer on the screen of a mouse, etc., an infrared pointer of a remote control, etc. may be used. In short, any device that designates a specific area of the display, and that updates the hierarchized screen in stages for control may be used.

Further, in the embodiment described above, the mobile terminal 1 and the on-vehicle device 2 are explained as separate apparatuses. However, the mobile terminal 1 and the on-vehicle device 2 may be configured as an integrated apparatus.

Further, in the embodiment described above, the operation manual and the operation command of the on-vehicle device 2 are transmitted to the mobile terminal 1. However, the operation manual and the like of the device connected to the on-vehicle device 2 may be transmitted to the mobile terminal 1. In this case, the model data 25*a* to be transmitted to the server 3 is the data indicating the type of the device connected to the on-vehicle device 2.

Furthermore, it is explained in the aforementioned embodiments that each function is performed by arithmetic processing performed by the CPU in accordance with a program as software. However, a part of functions may be implemented by an electrical hardware circuit.

While the invention has been shown and described in detail, the foregoing description is in all aspects illustrative and not restrictive. It is therefore understood that numerous other modifications and variations can be devised without departing from the scope of the invention.

What is claimed is:

1. A communication apparatus that is capable of communicating with an electronic apparatus, the communication apparatus comprising:
   a memory that stores a plurality of commands respectively corresponding to a plurality of user operations to be performed in a predetermined sequence on the electronic apparatus to cause the electronic apparatus to perform a predetermined operating procedure; and a controller that, upon selection of the predetermined operating procedure by a user of the communication apparatus, causes the communication apparatus to intermittently transmit each of the commands in the predetermined sequence from the communication apparatus to the electronic apparatus in accordance with the predetermined operating procedure, wherein the commands cause the electronic apparatus to display a sequence of operation screens according to each of the user operations, and to perform a predetermined function or display the operation screen related to the predetermined function upon receipt of the commands corresponding to the plurality of user operations in the predetermined sequence in accordance with the predetermined operating procedure.

2. The communication apparatus of claim 1, wherein:
the controller changes a transmission interval at which each of the commands is transmitted according to a user setting, and
the controller transmits each of the commands at the changed transmission interval.

3. The communication apparatus of claim 1, further comprising:
an input part by which a user's instruction is input to the communication apparatus, wherein
the controller transmits a single command among the plurality of commands in the predetermined sequence in accordance with the operating procedure every time the user's instruction is input to the input part after the predetermined operating procedure has been selected by the user.

4. The communication apparatus of claim 1, further comprising:
a receiver that receives a set of the plurality of commands from a predetermined server apparatus.

5. The communication apparatus of claim 4, wherein
the controller intermittently transmits each of the set of the plurality of commands received from the predetermined server apparatus to the electronic apparatus.

6. A server apparatus that communicates with a communication apparatus which is capable of communicating with an electronic apparatus, the server apparatus comprising:
a memory that stores a set of a plurality of commands respectively corresponding to a plurality of user operations to be performed in a predetermined sequence on the electronic apparatus to cause the electronic apparatus to perform a predetermined operating procedure for each model of a plurality of models of the electronic apparatus; and
a transmitter that transmits the set of the plurality of commands according to a specified model of the electronic apparatus to the communication apparatus, wherein
the commands, when transmitted from the communication apparatus to the electronic apparatus, cause the electronic apparatus to display a sequence of operation screens according to each of the user operations, and to perform a predetermined function or display the operation screen related to the predetermined function upon receipt of the commands corresponding to the plurality of user operations in the predetermined sequence in accordance with the predetermined operating procedure.

7. A communication system comprising an electronic apparatus and a communication apparatus that is capable of communicating with the electronic apparatus, wherein
the electronic apparatus includes:
an acceptance part that accepts a user operation; and
a display that displays a sequence of operation screens according to the user operation and that displays a final screen by which a predetermined function is performed or an operation screen related to the predetermined function after accepting a plurality of the user operations in accordance with a predetermined operating procedure, and
the communication apparatus includes:
a memory that stores a plurality of commands respectively corresponding to the plurality of user operations to be performed in a predetermined sequence on the electronic apparatus to cause the electronic apparatus to perform the predetermined operating procedure; and
a controller that, upon selection of the predetermined operating procedure by a user of the communication apparatus, causes the communication apparatus to intermittently transmit each of the commands in the predetermined sequence from the communication apparatus to the electronic apparatus in accordance with the predetermined operating procedure.

8. The communication system of claim 7, wherein
the acceptance part of the electronic apparatus includes a touch panel that accepts the plurality of user operations in accordance with the predetermined operating procedure.

9. A communication method by which a communication apparatus communicates with an electronic apparatus, the communication method comprising the steps of:
(a) obtaining, via the communication apparatus, a plurality of commands respectively corresponding to a plurality of user operations to be performed in a predetermined sequence on the electronic apparatus to cause the electronic apparatus to perform a predetermined operating procedure; and
(b) upon selection of the predetermined operating procedure by a user of the communication apparatus, intermittently transmitting each of the commands in the predetermined sequence from the communication apparatus to the electronic apparatus in accordance with the operating procedure, wherein
the commands cause the electronic apparatus to display a sequence of operation screens according to each of the user operations, and to perform a predetermined function or display the operation screen related to the predetermined function upon receipt of the commands corresponding to the plurality of user operations in the predetermined sequence in accordance with the predetermined operating procedure.

10. The communication method of claim 9, further comprising the step of:
changing a transmission interval at which each of the commands is transmitted from the communication apparatus to the electronic apparatus according to a user setting, wherein
the step (b) transmits each of the commands at the changed transmission interval.

11. A non-transitory computer-readable recording medium that stores a program to be executed by a computer which is included in a communication apparatus which communicates with an electronic apparatus, the program causing the computer to execute the steps of:

(a) obtaining, via the communication apparatus, a plurality of commands respectively corresponding to a plurality of user operations to be performed in a predetermined sequence on the electronic apparatus to cause the electronic apparatus to perform a predetermined operating procedure; and
(b) upon selection of the predetermined operating procedure by a user of the communication apparatus, intermittently transmitting each of the commands in the predetermined sequence from the communication apparatus to the electronic apparatus in accordance with the predetermined operating procedure, wherein
the commands cause the electronic apparatus to display a sequence of operation screens according to each of the user operations, and to perform a predetermined function or display the operation screen related to the predetermined function upon receipt of the commands corresponding to the plurality of user operations in the predetermined sequence in accordance with the predetermined operating procedure.

\* \* \* \* \*